United States Patent
Riemer

(10) Patent No.: US 8,464,534 B1
(45) Date of Patent: Jun. 18, 2013

(54) NITROGEN PRESSURE-BASED ENGINE DEVICE

(76) Inventor: Gary D. Riemer, Jamestown, ND (US)

( * ) Notice: Subject to any disclaimer, the term of this patent is extended or adjusted under 35 U.S.C. 154(b) by 820 days.

(21) Appl. No.: 12/691,429

(22) Filed: Jan. 21, 2010

(51) Int. Cl.
*F01B 31/00* (2006.01)

(52) U.S. Cl.
USPC .............................................. 60/657; 60/671

(58) Field of Classification Search
USPC .................................... 60/651, 671, 646, 657
See application file for complete search history.

(56) References Cited

U.S. PATENT DOCUMENTS

| | | | | |
|---|---|---|---|---|
| 3,772,879 | A | * | 11/1973 | Engdahl ........................... 60/671 |
| 4,227,374 | A | * | 10/1980 | Oxley .............................. 60/651 |
| 4,294,323 | A | | 10/1981 | Boese |
| D278,163 | S | | 3/1985 | Carignan et al. |
| 4,765,143 | A | * | 8/1988 | Crawford et al. ................ 60/671 |
| 5,095,709 | A | | 3/1992 | Billiot |
| 5,150,685 | A | | 9/1992 | Porter et al. |
| 5,666,923 | A | | 9/1997 | Collier, Jr. et al. |
| 6,349,787 | B1 | | 2/2002 | Dakhil |
| 6,898,935 | B2 | * | 5/2005 | Barber et al. .................... 60/646 |
| 7,647,774 | B2 | * | 1/2010 | Shirk et al. ...................... 60/651 |

* cited by examiner

*Primary Examiner* — Hoang Nguyen

(57) ABSTRACT

A nitrogen pressure-based engine device featuring a main engine chamber with a turbine blade system; a liquid nitrogen storage tank; a heater/vaporizer chamber for converting liquid nitrogen to gas nitrogen fluidly connected to the storage tank and to the nozzle block of the main engine chamber; a pressure condenser for condensing gas nitrogen to liquid nitrogen fluidly connected to the main engine chamber and to the storage tank; wherein liquid nitrogen flows from the storage tank to heater/vaporizer chamber then gas nitrogen flows to the main engine chamber via the nozzle block, the gas nitrogen drives rotation of the turbine blade system, the gas nitrogen then flows to the pressure condenser to be condensed to liquid nitrogen, the liquid nitrogen then flows from the pressure condenser to the storage tank.

9 Claims, 3 Drawing Sheets

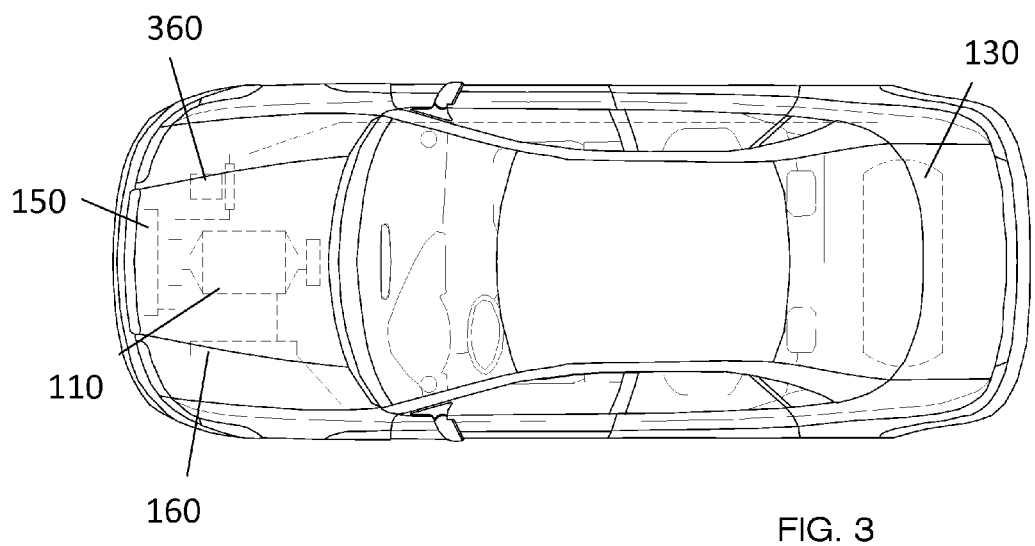
FIG. 3
(Top View)
Car Example
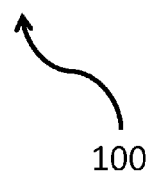

US 8,464,534 B1

NITROGEN PRESSURE-BASED ENGINE DEVICE

FIELD OF THE INVENTION

The present invention is directed to engines and generators, more particularly to a generator device that is powered via nitrogen.

BACKGROUND OF THE INVENTION

Gasoline and diesel generator systems have been in use for many years. The present invention features a nitrogen pressure-based engine device, which can be used as an emergency electrical generator. The nitrogen pressure-based engine device can recycle and reuse nitrogen, which can help eliminate the need to refill the system when empty. The engine device of the present invention is more environmentally friendly than alternative traditional gasoline or diesel generators.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a nitrogen pressure-based engine device comprising a main engine chamber 110 comprising a nozzle block 380 and a turbine vacuum pump 140, wherein a turbine blade system 120 is disposed in an inner cavity of the main engine chamber 110; a storage tank 130 for storing liquid nitrogen, the storage tank 130 comprises an evacuation port 217 for evacuating liquid nitrogen if needed; a heater/vaporizer chamber 320 for converting liquid nitrogen to high pressure gas nitrogen, wherein the heater/vaporizer chamber 320 is fluidly connected to the storage tank 130 via a first line 210 and the heater/vaporizer chamber 320 is fluidly connected to the nozzle block 380 of the main engine chamber 110 via a second line 220; a pump operatively connected to the heater/vaporizer chamber, the pump functions to pump high pressure gas nitrogen from the heater/vaporizer chamber to the nozzle block of the main engine chamber; a pressure condenser 160 for condensing nitrogen to liquid nitrogen, the pressure condenser 160 is fluidly connected to the main engine chamber 110 via a third line 230, the pressure condenser 160 is fluidly connected to the storage tank 130 via a fourth line 240; a shutdown valve 460 operatively connected to the turbine blade system, the shut-down valve 460 is activated if the turbine blade system reaches a critical speed, the shut-down valve causes the engine device to shut down and an emergency pressure relief component operatively connected to the turbine blade system, wherein if the turbine blade system reaches a critical pressure the emergency pressure relief component is activated to relieve pressure in the turbine blade system; wherein liquid nitrogen flows from the storage tank to heater/vaporizer chamber where it is converted to high pressure gas nitrogen, wherein the high pressure gas nitrogen flows from the heater/vaporizer chamber to the main engine chamber via the nozzle block, wherein the high pressure gas nitrogen in the main engine chamber drives rotation of the turbine blade system, wherein the high pressure gas nitrogen then flows from the main engine chamber to the pressure condenser wherein the high pressure gas nitrogen is condensed to liquid nitrogen, the liquid nitrogen then flows from the pressure condenser to the storage tank.

In some embodiments, the storage tank 130 is a double-walled insulated pressure vessel. In some embodiments, the nozzle block 380 comprises nozzles, an actuator stem, and a gas inlet aperture. In some embodiments, the high-pressure gas nitrogen enters the nozzle block 380 and passes through the gas inlet aperture and nozzle when the actuator stem is raised. In some embodiments, a check valve 182 is disposed in the fourth line.

In some embodiments, the pump is an electric idler pump 360, a vapor supercharger pump 150, or both an electric idler pump 360 and vapor supercharger pump 150. In some embodiments, the electric idler pump 360 functions as a gas supercharger to increase a pressure of the nitrogen prior to delivery of the nitrogen to the nozzle block of the main engine chamber. In some embodiments, the electric idler pump 360 drives rotation of the turbine blade system up to a particular speed. In some embodiments, when the turbine blade system reaches the particular speed, the vapor supercharger pump 150 takes over and the electric idler pump 360 is shut down and bypassed. In some embodiments, the device further comprises a power take off shaft for harnessing mechanical power in the form of torque from the turbines.

BRIEF DESCRIPTION OF THE DRAWINGS

FIG. 3 is a top view of the nitrogen pressure-based engine device of the present invention as used in a vehicle.

DESCRIPTION OF PREFERRED EMBODIMENTS

Figure 1:
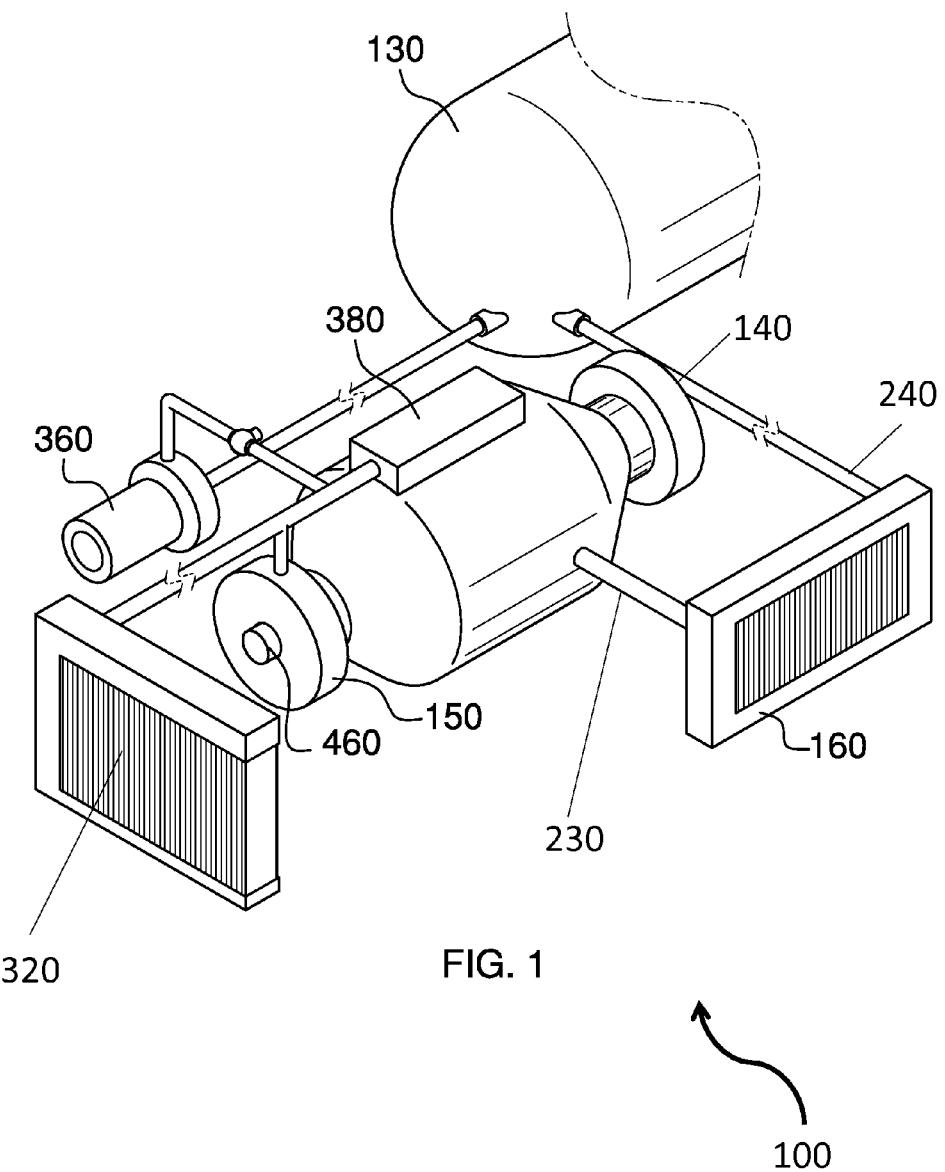
FIG. 1 is a perspective view of the nitrogen pressure-based engine device of the present invention.
Figure 2:
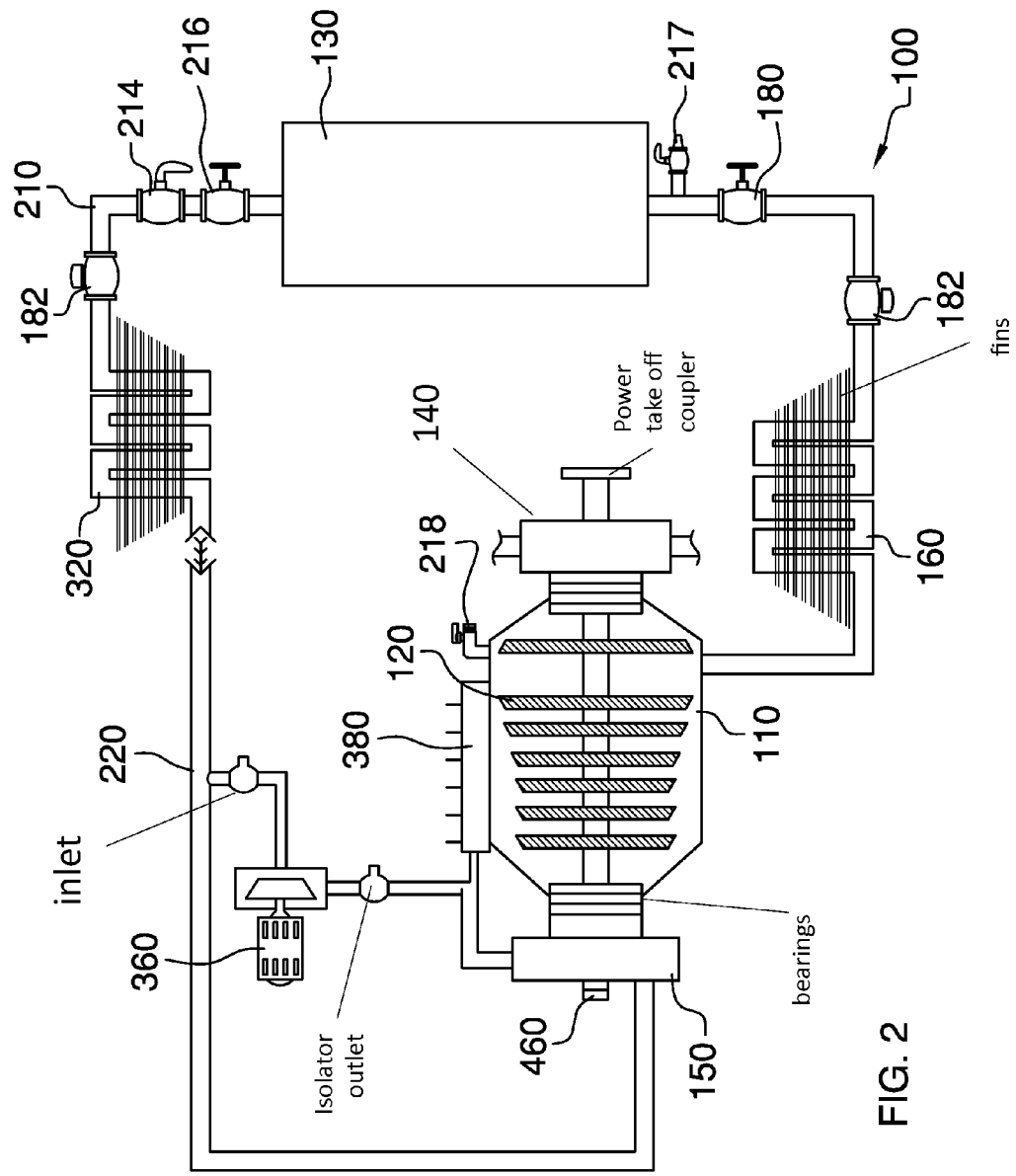
FIG. 2 is a schematic representation of components of the nitrogen pressure-based engine device of the present invention.

Referring now to FIGS. 1-3, the present invention features a nitrogen pressure-based engine device 100 that utilizes nitrogen. The engine device 100 may be used to supply electricity in various situations such as emergencies, similar to a generator. Without wishing to limit the present invention to any theory or mechanism, it is believed that the engine device 100 is advantageous because it can provide an alternative form of power without burning fossil fuels. The engine device 100 of the present invention may be used for a variety of application such as in homes and buildings as well as in vehicles.

The engine device 100 of the present invention can recycle and reuse nitrogen instead of expelling it into the atmosphere. This can help reduce or eliminate the need to refill the device 100. However, the device 100 may need to be refilled on some occasions, for example if nitrogen has leaked or needs to be removed for maintenance purposes (e.g., replacement of bearings, seals, etc.).

The engine device 100 of the present invention runs at high pressure with multiple stages. This can help provide more torque, which supplies more power for the engine. This can help provide quicker acceleration (e.g., for extended use speeds, runnings, extreme conditions, etc.). The super chargers and/or high pressures aid in the operation of the device 100 in cold climates. Dependence on high ambient temperature (to create pressure) is removed because the device 100 creates its own pressure. In some embodiments, the device comprises a small battery-operated gas amplifier pump to enhance turbine start in cold conditions. In some embodiments, synthetic turbine oil can be used for lubrication purposes, thereby eliminating use of fossil-based products (or fossil-based products are used in limited quantities only).

The engine device 100 of the present invention comprises a main engine chamber 110 having a turbine blade system (e.g., a plurality of turbine blades 120 on a rotating shaft) disposed in its inner cavity. The main engine chamber 110 has a first end and a second end. In some embodiments, a turbine vacuum pump 140 is disposed on the first end of the main engine chamber 110. Turbine blade systems and vacuum pumps are well known to one of ordinary skill in the art.

The engine device 100 further comprises a storage tank 130 for storing nitrogen (e.g., liquid nitrogen). In some embodiments, the storage tank 130 is a double-walled insulated pressure vessel. Generally, the storage tank 130 stores enough nitrogen (e.g., liquid nitrogen) for various applications such as operating a vehicle. The storage tank 130 may be refillable (if needed).

Nitrogen (e.g., liquid nitrogen) is fed from the storage tank 130 to a heater/vaporizer chamber 320 via a first line 210 (e.g., the storage tank 130 is fluidly connected to the heater/vaporizer chamber 320 via the first line 210). Heater/vaporizer chambers are well known to one of ordinary skill in the art. The heater vaporizer chamber 320 allows the liquid nitrogen to convert to a gas with heat being added (if necessary). The nitrogen gas achieves high pressure.

From the heater/vaporizer chamber 320, the nitrogen (e.g., high-pressure gas) is fed to the main engine chamber 110 via a second line 220. In some embodiments, nitrogen enters the main engine chamber 110 via a nozzle block 380 (disposed on the main engine chamber 110). Nozzle blocks are well known to one of ordinary skill in the art. The nozzle block 380 may comprise nozzles, actuator stems, and a gas inlet aperture. The high-pressure nitrogen may enter the nozzle block 380 and pass through the gas inlet aperture and nozzle with the stem raised. The high-pressure nitrogen drives the rotation of the turbine blade system (e.g., blades 120). In some embodiments, the more the stem is raised the higher the flow of nitrogen (and thus increasing power). In some embodiments, more stems may be opened to drive additional turbine stages.

A pump may help deliver the nitrogen from the heater/vaporizer chamber 320 to the main engine chamber 110. The pump may be an electric idler pump 360 or a vapor supercharger pump 150. In some embodiments, the electric idler pump 360 serves as a gas supercharger to raise pressure for delivery of nitrogen to the main engine chamber 110 and/or nozzle block 380. The electric idler pump 360 may drive the turbine blades 120 to rotate and drive them up to a particular speed (e.g., an idling speed, operating speed). In some embodiments, the turbine blades 120 reach a particular speed (e.g., idling speed, operating speed), the vapor supercharger pump 150 takes over and the electric idler pump 150 is shut down and bypassed.

In some embodiments, a solenoid valve 214 and/or a shut off valve 216 are disposed in the first line 210. In some embodiments, an isolation valve 180 and/or a check valve 182 are disposed in the fourth line 240.

In some embodiments, the engine device 100 of the present invention further comprises a turbine over-speed trip 460 (e.g., shut-down valve). The turbine over-speed trip 460 (e.g., shut-down valve) is activated as a safety feature if the turbine blades 120 reached a critical speed. This may help protect the system from failure.

From the main engine chamber 110, the nitrogen may be delivered to a pressure condenser 160 via a third line 230. From the pressure condenser 160, the nitrogen returns to the storage tank 130 via a fourth line 240.

In some embodiments, the engine device 100 of the present invention further comprises a power take off shaft for providing mechanical power in the form of torque from the turbines.

In some embodiments, the device 100 comprises an emergency pressure relief component 218 operatively connected to the turbine blade system, wherein if the turbine blade system reaches a critical pressure the emergency pressure relief component 218 is activated to relieve pressure in the turbine blade system. In some embodiments, the storage tank 130 comprises an evacuation port 217 for evacuating liquid nitrogen if needed.

As shown in FIG. 2, the main engine chamber comprises bearings (e.g., high speed bearings, carbon block seals). Disposed on the nozzle block 380 may be nozzle actuator rods. The turbine blades 120 may be reaction/impulse turbine blades. A power take-off coupler may be operatively connected to the main engine chamber. In some embodiments, the device 100 comprises a reverse turbine (which can help remove pressure).

As shown in FIG. 3, in some embodiments, the engine device 100 is used in a vehicle. The main engine chamber 110 may be placed at or near the front end of the vehicle, and the storage tank 130 may be positioned at or near the rear of the vehicle.

The following the disclosures of the following U.S. Patents are incorporated in their entirety by reference herein: U.S. Pat. No. 4,294,323; U.S. Pat. No. 6,349,787; U.S. Pat. No. 5,150,685; U.S. Pat. No. 5,095,709; U.S. Pat. No. 5,666,923.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A nitrogen pressure-based engine device (100) comprising:
   (a) a main engine chamber (110) comprising a nozzle block (380) and a turbine vacuum pump (140), wherein a turbine blade system (120) is disposed in an inner cavity of the main engine chamber (110);
   (b) a storage tank (130) for storing liquid nitrogen, the storage tank (130) comprises an evacuation port (217) for evacuating liquid nitrogen if needed;
   (c) a heater/vaporizer chamber (320) for converting liquid nitrogen to high pressure gas nitrogen, wherein the heater/vaporizer chamber (320) is fluidly connected to the storage tank (130) via a first line (210) and the heater/vaporizer chamber (320) is fluidly connected to the nozzle block (380) of the main engine chamber (110) via a second line (220);
   (d) a pump operatively connected to the heater/vaporizer chamber, the pump functions to pump high pressure gas nitrogen from the heater/vaporizer chamber to the nozzle block of the main engine chamber;
   (e) a pressure condenser (160) for condensing nitrogen to liquid nitrogen, the pressure condenser (160) is fluidly connected to the main engine chamber (110) via a third line (230), the pressure condenser (160) is fluidly connected to the storage tank (130) via a fourth line (240);
(f) a shut-down valve (460) operatively connected to the turbine blade system, the shut-down valve (460) is activated if the turbine blade system reaches a critical speed, the shut-down valve causes the engine device to shut down and
(g) an emergency pressure relief component (218) operatively connected to the turbine blade system, wherein if the turbine blade system reaches a critical pressure the emergency pressure relief component (218) is activated to relieve pressure in the turbine blade system;
wherein liquid nitrogen flows from the storage tank to heater/vaporizer chamber where it is converted to high pressure gas nitrogen, wherein the high pressure gas nitrogen flows from the heater/vaporizer chamber to the main engine chamber via the nozzle block, wherein the high pressure gas nitrogen in the main engine chamber drives rotation of the turbine blade system, wherein the high pressure gas nitrogen then flows from the main engine chamber to the pressure condenser wherein the high pressure gas nitrogen is condensed to liquid nitrogen, the liquid nitrogen then flows from the pressure condenser to the storage tank.

2. The engine device of claim 1, wherein the storage tank (130) is a double-walled insulated pressure vessel.

3. The engine device of claim 1, wherein the nozzle block (380) comprises nozzles, an actuator stem, and a gas inlet aperture.

4. The engine device of claim 3, wherein the high-pressure gas nitrogen enters the nozzle block (380) and passes through the gas inlet aperture and nozzle when the actuator stem is raised.

5. The engine device of claim 1, wherein a check valve (182) is disposed in the fourth line.

6. The engine device of claim 1, wherein the pump is an electric idler pump (360), a vapor supercharger pump (150), or both an electric idler pump (360) and vapor supercharger pump (150).

7. The engine device of claim 6, wherein, the electric idler pump (360) functions as a gas supercharger to increase a pressure of the nitrogen prior to delivery of the nitrogen to the nozzle block of the main engine chamber.

8. The engine device of claim 7, wherein, the electric idler pump (360) drives rotation of the turbine blade system up to a particular speed.

9. The engine device of claim 8, wherein when the turbine blade system reaches the particular speed, the vapor supercharger pump (150) takes over and the electric idler pump (380) is shut down and bypassed.

* * * * *